(12) United States Patent
Steigleder et al.

(10) Patent No.: US 11,999,647 B2
(45) Date of Patent: Jun. 4, 2024

(54) GLASS OPTICAL WAVEGUIDE WITH VARIABLE CROSS SECTION

(71) Applicant: SCHOTT AG, Mainz (DE)

(72) Inventors: Jan Philipp Steigleder, Budenheim (DE); Bernd Schultheis, Schwabenheim (DE); Martin Cramer, Wiesbaden (DE); Christian Schwedler, Mainz (DE); Hubertus Russert, Jugenheim (DE); Bernhard Hunzinger, Wackernheim (DE); Holger Werner, Frankfurt am Main (DE)

(73) Assignee: SCHOTT AG, Mainz (DE)

( * ) Notice: Subject to any disclaimer, the term of this patent is extended or adjusted under 35 U.S.C. 154(b) by 175 days.

(21) Appl. No.: 17/460,091

(22) Filed: Aug. 27, 2021

(65) Prior Publication Data

US 2021/0403366 A1     Dec. 30, 2021

Related U.S. Application Data

(63) Continuation of application No. PCT/EP2020/054894, filed on Feb. 25, 2020.

(30) Foreign Application Priority Data

Feb. 28, 2019   (DE) ..................... 10 2019 105 183.5

(51) Int. Cl.
*G02B 6/00*     (2006.01)
*C03B 23/047*   (2006.01)
(Continued)

(52) U.S. Cl.
CPC .......... *C03B 37/032* (2013.01); *C03B 23/047* (2013.01); *C03B 37/02* (2013.01);
(Continued)

(58) Field of Classification Search
None
See application file for complete search history.

(56) References Cited

U.S. PATENT DOCUMENTS

| 1,751,584 A | 3/1930 | Hansell |
| 4,799,949 A | 1/1989 | Keck |

(Continued)

FOREIGN PATENT DOCUMENTS

| JP | H0669913 | 9/1994 |
| JP | 2003185854 | 7/2003 |

(Continued)

OTHER PUBLICATIONS

International Search Report dated May 18, 2020 for PCT/EP2020/054894, with English translation, 4 pages.

*Primary Examiner* — Chad H Smith
(74) *Attorney, Agent, or Firm* — Ruggiero McAllister & McMahon LLC

(57) ABSTRACT

A drawn glass element for producing glass optical waveguides is provided. The element has two first length portions with a first cross-sectional area and which define the two ends of the glass element; a second, intermediate length portion between the two first length portions, which has a second cross-sectional area smaller than the first cross-sectional area; a first transition portion between the intermediate length portion and one of the first length portions; and a second transition portion between the intermediate length portion and another of the first length portions. The first and second transition portions have a cross-sectional area that steadily changes and merges from the first cross-sectional area into the second cross-sectional area.

19 Claims, 7 Drawing Sheets

(51) Int. Cl.
  *C03B 37/02*   (2006.01)
  *C03B 37/03*   (2006.01)
  *C03B 37/15*   (2006.01)
  *F21V 8/00*   (2006.01)

(52) U.S. Cl.
  CPC ............ *C03B 37/15* (2013.01); *G02B 6/0046* (2013.01); *G02B 6/0058* (2013.01)

(56) References Cited

U.S. PATENT DOCUMENTS

| | | | |
|---|---|---|---|
| 4,820,321 A | | 4/1989 | Presby |
| 5,511,141 A | * | 4/1996 | Peli .......................... G02B 6/06 |
| | | | 385/116 |
| 6,658,896 B2 | | 12/2003 | Galarza |
| 7,305,166 B1 | * | 12/2007 | Higby .................. G02B 6/0281 |
| | | | 385/115 |
| 2001/0031115 A1 | | 10/2001 | Chen |
| 2003/0138753 A1 | | 7/2003 | Galarza |
| 2003/0174948 A1 | * | 9/2003 | Davis .................. G02B 6/0218 |
| | | | 385/37 |
| 2007/0201802 A1 | | 8/2007 | Mihailov |
| 2011/0176776 A1 | | 7/2011 | Imamura |
| 2014/0242538 A1 | | 8/2014 | Senn |

FOREIGN PATENT DOCUMENTS

| | | |
|---|---|---|
| JP | 2011145562 | 7/2011 |
| JP | 2014528802 | 10/2014 |

* cited by examiner

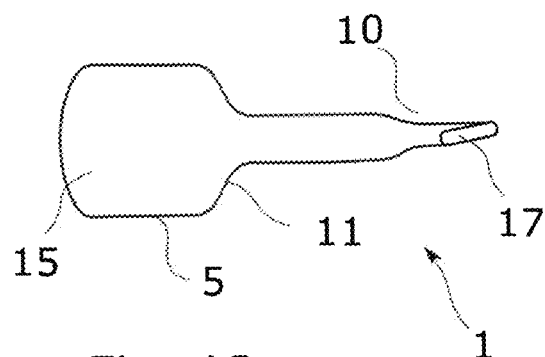
Fig. 13
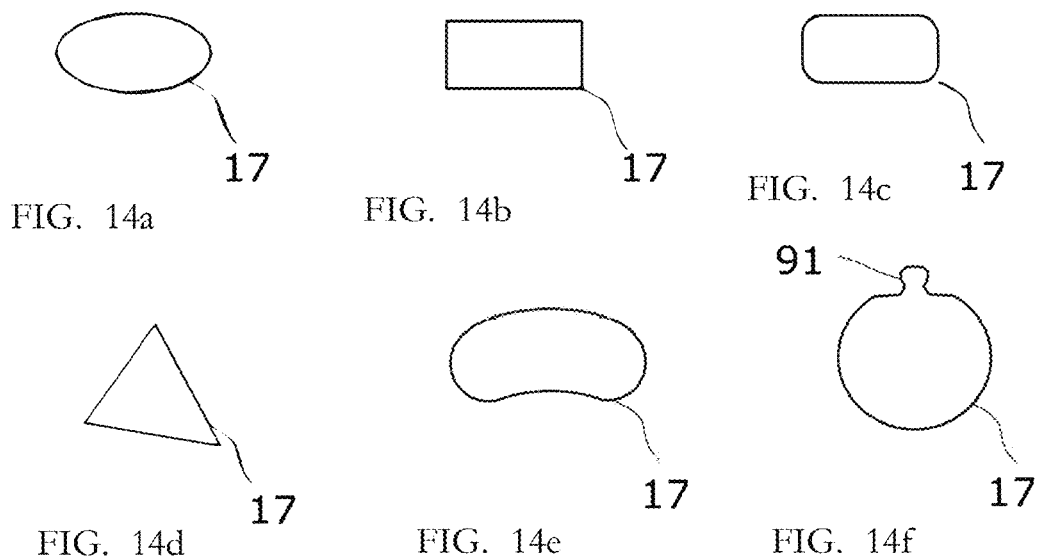
FIG. 14a  FIG. 14b  FIG. 14c
FIG. 14d  FIG. 14e  FIG. 14f
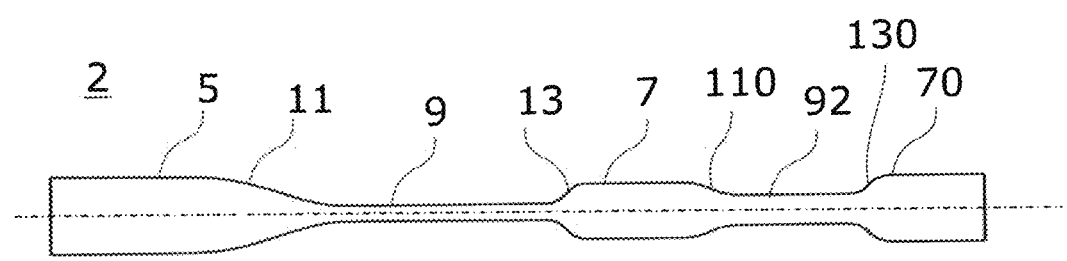
Fig. 15

GLASS OPTICAL WAVEGUIDE WITH VARIABLE CROSS SECTION

CROSS REFERENCE TO RELATED APPLICATIONS

This application is a continuation of International Application PCT/EP2020/054894 filed Feb. 25, 2020, which claims benefit under 35 USC § 119 of German Application No. DE 10 2019 105 183.5 filed Feb. 28, 2019, the entire contents of which are incorporated herein by reference.

BACKGROUND

1. Field of the Invention

The invention generally relates to optical waveguides. More particularly, the invention relates to optical waveguides made of glass, which have a cross section that varies along the extension of the optical waveguide.

2. Discussion of Related Art

Optical waveguides with varying cross section are used in dental medicine, inter alia, where light is used to cure UV-curing plastics for tooth fillings, for example.

In this case, the task is to supply as much light as possible while allowing for easy handling of the tool. In recent years, photocurable synthetic resins have become very important for dental treatments. Such synthetic resins, which are typically curable using blue LED light, are employed as sealants, for tooth reconstruction, and for orthodontic treatments.

Nowadays, curing devices or handpieces are essential tools for dental treatments. Many of these devices use rigid optical waveguides to direct light from light emitting diodes to the tip of the handpiece or tool. These optical waveguides may taper towards the tip in order to supply a maximum of light.

Although instruments are available, which use light-emitting diodes directly at the point of radiation to cure the synthetic resins, handpieces with optical waveguides are common because they are easier sterilized. This is because the glass rod can easily be removed and autoclaved and/or cleaned. This makes it easier to comply with the hygiene standards for the employed instruments. The optical waveguides may also be curved in order to permit to reach all parts of the oral cavity. Such devices are often preferred since a curved optical waveguide offers the possibility of rotating the optical waveguide so as to radiate at different angles in order to improve its manageability. This is important because thorough curing requires comprehensive, uninterrupted exposure to light.

Curing instruments should provide as much light as possible to the tooth in order to keep treatment times short. This means that large optical waveguides were necessary in order to provide the required light intensity, despite dimensions uncomfortable for the patient.

Hitherto, for producing glass optical waveguides which have a taper, a glass rod was heated in a mid-section until the glass softened and then drawn apart so that a waist-like constriction was formed. The glass rod can then be severed at the midpoint of the constriction so that two optical waveguides are obtained tapering at the ends. Such a method is disclosed in U.S. Pat. No. 6,658,896 B2. U.S. Pat. No. 7,305,166 B1 discloses a method for producing GRIN optical waveguides, in which an optical waveguide is heated and stretched to form a constriction. Furthermore, US 2007/0201802 A1 discloses a photonic optical waveguide tapering to form a constriction.

SUMMARY

The invention is now based on the object of providing optical waveguides that are getting thinner or wider, depending on the direction of the light, and which are improved in terms of manageability. This problem is solved by the subject-matter of the present application. Accordingly, a drawn glass element is provided for producing preferably light-concentrating glass optical waveguides, which comprise two first length portions that have a first cross-sectional area and which define the two ends of the glass element. Furthermore, the glass element comprises a second, intermediate length portion between the first length portions, which has a second cross-sectional area smaller than the first cross-sectional area of the first length portions, and two transition portions, a respective one between the intermediate length portion and each of the first length portions. Along the transition portions, the cross-sectional area of the glass element steadily changes and merges from the first cross-sectional area into the second cross-sectional area. In a preferred embodiment, the first length portions are provided at the ends. The glass element thus has a dumbbell-like shape.

In a preferred embodiment, the second, intermediate length portion has a length of at least three times the square root of the second cross-sectional area. According to a particularly preferred embodiment, the intermediate length portion is at least as long as the added length of the transition portions. Within the intermediate length portion, the cross section in particular remains consistent, likewise in the end-side length portions. The intermediate length portion can then be defined as the length portion within which the cross-sectional area is larger than the second cross-sectional area by at least a factor of 1.025 and smaller than the first cross-sectional area by at least a factor of 1.025. Below, the second length portion between the first length portions is referred to as the intermediate length portion. Since, moreover, the transition portions with changing cross sections adjoin the intermediate length portion, the intermediate length portion is also located between the transition portions.

Furthermore preferably, the first cross-sectional area is larger than the second cross-sectional area by at least a factor of 1.1 in order to achieve significant concentration or dispersion of light intensity, depending on the direction of light conduction.

The dumbbell-shaped glass element can then be severed in the intermediate length portion. In this way, a drawn glass optical waveguide is obtained. Generally, both pieces obtained by the severing can be used as such tapering glass optical waveguides. Hence, according to a further aspect, a drawn glass optical waveguide is provided, which in particular is producible by severing the dumbbell-shaped glass element at the intermediate length portion, which comprises a first length portion that terminates at a first end face of the optical waveguide, for injection of light or emission of light, the first length portion having a first cross-sectional area; and a second length portion having a second cross-sectional area, which terminates at a second end face, for injection of light or emission of light, so that light can be injected into the optical waveguide at one of the end faces and can be emitted at the other end face, wherein the cross-sectional area of the first length portion is larger than the cross-sectional area of the second length portion, preferably by at least a factor of 1.1, and wherein the cross-sectional area steadily changes along a transition portion between the first length portion and the second length portion such that the transition portion tapers from the first length portion to the second length portion. The second length portion then has a length of at least 1.5 times, preferably at least three times the square root of the second cross-sectional area.

The dumbbell-shaped glass element and also the glass optical waveguide separated therefrom can be produced by a method which comprises providing a glass rod and supporting the glass rod using two brackets, the brackets supporting the glass rod in two areas spaced apart in the longitudinal direction of the glass rod; and irradiating, by a heating device, an annular area of the surface and hence a length portion of the glass rod and thereby heating it until it softens; subsequently drawing apart the glass rod at the brackets so that the glass rod tapers within the softened length portion, and shifting the annular area and the glass rod relative to one another along the longitudinal extension of the glass rod, while a predetermined speed profile for the relative shift and a predetermined speed profile for the rate of drawing apart the glass rod is set for the drawing apart and for the shifting of the annular area, wherein the two speed profiles are interlinked such that an intermediate length portion is drawn between two end-side length portions, which has a second cross-sectional area that is reduced by at least a factor of 1.2 compared to the first cross-sectional area of the end-side length portions, which merges into the end-side length portions along transition portions that have a steadily increasing cross section.

Heating devices that can be employed include radiation sources as well as burners or inductive heaters. A light source is particularly suitable as a heating device. The radiation or light used for the heating is infrared light with a wavelength of at least 1 µm, in particular with a wavelength of at least 5 µm.

Light for heating the glass rod may in particular also include infrared light. A laser is a particularly suitable and preferred light source. Such a light source allows to irradiate light for heating the glass rod in a locally precisely limited manner. In particular a $CO_2$ laser is suitable as a laser. It can emit light with a wavelength of 5.5 µm and/or with a wavelength of 10.6 µm, which is quickly and completely absorbed in the glass. Other suitable lasers are Nd:YAG lasers with a laser wavelength of approx. 1064 µm, Ho:YAG lasers, or Tm:YAG lasers with laser wavelengths in a range from approx. 1.9 µm to 2.1 µm, Er:YAG lasers with a laser wavelength of about 2.94 µm. Furthermore, it is also possible to combine two or more heating devices of the same type or of different types. For example, large-area preheating could be achieved using an infrared lamp, and targeted local further heating using a laser. Furthermore, heating profiles that are variable in terms of time and/or location can also be used, which optionally also have different energy densities. For example, the preheating as mentioned above may be achieved with a lower energy density, and a very high energy density can be introduced locally into the annular area using the intense laser beam.

The ring-shaped area does not have to be constantly illuminated around the entire circumference. Rather, it is also possible to irradiate the light onto a partial area of the circumference and to rotate the glass rod so that the surface of the ring-shaped area is scanned by the light beam or so that the light beam travels over the surface annularly. More generally, it is therefore contemplated according to a further embodiment that the glass rod is rotated about its longitudinal axis while being irradiated by the light source.

According to one embodiment, the optical waveguide is a simple core-cladding optical waveguide in which a core made of a first glass is surrounded by a cladding made of a second glass which has a lower refractive index than the first glass, so that light can be conducted in the core. A non-cladding conductor is also conceivable. According to yet another embodiment, the optical waveguide comprises a plurality of cores, each of which may be surrounded by their own cladding or may be embedded in a common cladding.

The invention will now be explained in more detail with reference to the accompanying drawings. In the drawings, the same reference numerals denote the same or equivalent elements.

BRIEF DESCRIPTION OF THE FIGURES

FIG. 13 shows an optical waveguide produced from the glass element of FIG. 12.

FIGS. 14*a*-14*f* shows various cross-sectional shapes of the end face of an optical waveguide.

FIG. 15 shows a glass element having two intermediate portions of reduced cross-sectional area.

DETAILED DESCRIPTION

Figure 1:
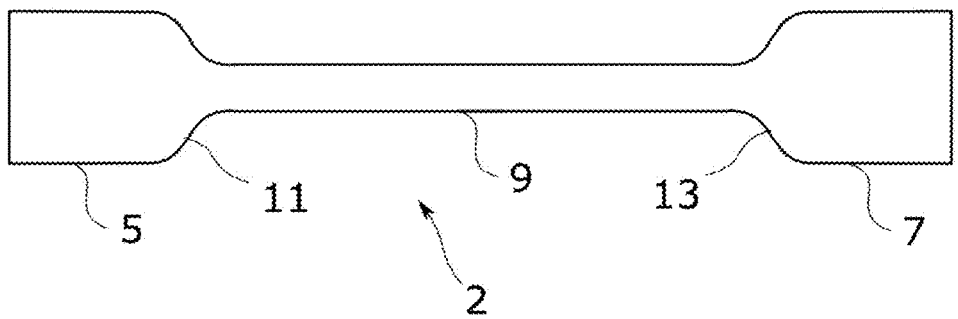
FIG. 1 shows a side view of a dumbbell-shaped glass element.

FIG. 1 shows a dumbbell-shaped glass element 2 for producing a tapering glass optical waveguide. Glass element 2 is produced by drawing. That is, the shape of the glass element is obtained by hot forming. Without being limited to the specific example shown, a dumbbell-shaped glass element 2 according to the present disclosure will therefore in particular also have a fire-polished surface. The ends of glass element 2 are defined by two length portions 5, 7. Between these end-side length portions 5, 7 there is an intermediate length portion 9 which differs from the end-side length portions 5, 7 in terms of its cross section, in the case of a circular glass element 2 it accordingly also differs in diameter. The cross-sectional area of the end-side length portions 5, 7 is greater than the cross-sectional area of intermediate length portion 9. Along the respective portions, the first cross-sectional area of the end-side length portions 5, 7 and the second cross-sectional area of the intermediate length portion 9 remain essentially consistent. Thus, in a mathematical sense, the length portions 5, 7, 9 accordingly have a generally prismatic shape, and in the special case of a circular cross section a cylindrical shape. The cross-sectional areas of the intermediate and end-side length portions 9, 5, 7 differ by at least a factor of 1.2. Accordingly, the following relationship generally applies to the first cross-sectional area Q1 and the second cross-sectional area Q2: Q1≥1.1·Q2. Without being limited to the example shown, it is contemplated according to a preferred embodiment that for the cross-sectional areas the ratio Q1/Q2 is in a range from 1.1 to 100. In terms of the diameter of dumbbell-shaped glass elements and the optical waveguides made therefrom, the ratio D1/D2 of the diameter D1 of the end-side length portions 5, 7 to the diameter D2 of the intermediate length portion 9 or second length portion of the optical waveguide is in the range from 1.1 to 10.

Even if the glass element 2 does not have a circular cross section, it is possible to associate a diameter with the cross section. Such a diameter may simply be specified as the diameter of a circular area that is of the same size as the cross-sectional area. In the case of a glass element with a square cross section with side length "a" of the square, the associated resulting diameter would be $$D = \sqrt{\frac{4a^2}{\pi}}.$$

Furthermore, it is contemplated that the intermediate thinner portion of the dumbbell-shaped glass element 2, that is intermediate length portion 9, has a certain length with a constant cross section. More particularly, the intermediate length portion 9 has a length which is at least three times as long as the length value corresponding to the square root of the second cross-sectional area. In the illustrated example, the intermediate length portion 9 is significantly longer. Assuming a circular cross section, the length portion 9 in the example would be about ten times as long as the diameter. In this case, the result would be a length of about 11 times the square root of the cross-sectional area.

The adjacent length portions merge into one another through transition portions 11, 13. Along the transition portions 11, 13, the cross-sectional area changes steadily, namely it increases steadily from the intermediate length portion 9 until reaching the first cross-sectional area at the end-side length portions 5, 7.

Without being limited to the illustrated example, it is contemplated according to a further embodiment that the largest lateral dimension of the end-side length portions 5, 7 is less than 50 mm, preferably less than 30 mm, more preferably less than 20 mm, most preferably less than 15 mm. In the case of a glass element 2 with a circular cross section, this largest lateral dimension corresponds to the diameter of the end-side length portions 5, 7. These dimensions are particularly suitable for handpieces in the medical field, inter alia, preferably in the dental field.

Figure 2:
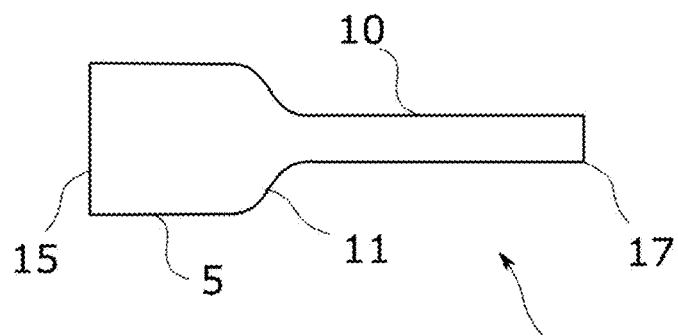
FIG. 2 shows a glass optical waveguide.

The drawn dumbbell-shaped glass element 2 can now be severed in the intermediate thinner length portion 9. The piece separated in this way defines a glass optical waveguide 1 as shown in FIG. 2. If the separation is made at the midpoint of the intermediate length portion, as is preferred, then two glass optical waveguides 1 of the same type will be obtained. The glass optical waveguide 1, as shown in FIG. 2 by way of example, generally comprises a first length portion 5 which terminates at a first end face 15, and a second length portion 10 with a second cross-sectional area, which terminates at a second end face 17. Light that is injected at one of the end faces 15, 17 is then conducted within the glass optical waveguide 1 to the other end face and exits there, and depending on which of the end faces 15, 17 the injection occurs, light concentration or light diffusion will be resulting. Usually and most preferably, the glass optical waveguide 1 will be used as a light-concentrating optical waveguide. For this purpose, the end face 15 will be used as a light entry face.

According to the shape of the dumbbell-shaped glass element 2, the cross-sectional area of the first length portion 5 is larger than the cross-sectional area of the second length portion 10 by at least a factor of 1.2. The cross-sectional area changes steadily along the transition portion 11 between the first length portion 5 and the second length portion 10, with the transition portion tapering from the first length portion 5 to the second length portion 10. The second length portion 9 has a length of at least 1.5 times, preferably at least three times the square root of the second cross-sectional area.

Figure 3:
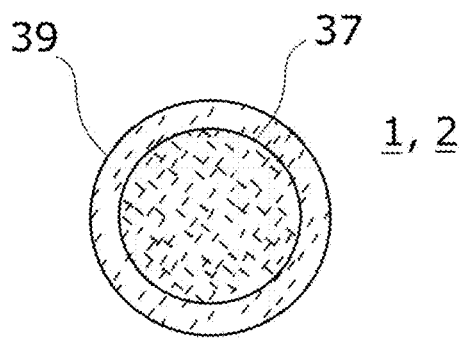
FIGS. 3 and 4 are cross-sectional views of a glass element or glass optical waveguide.
Figure 4:
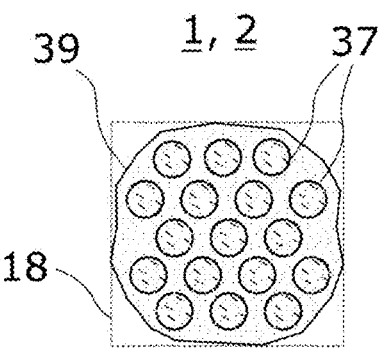

FIGS. 3 and 4 schematically illustrate cross sections of dumbbell-shaped glass elements 2 or glass optical waveguides 1. FIG. 3 is an example of an embodiment in which the length portions of the dumbbell-shaped glass element 2 or of the optical waveguide 1 made therefrom have a circular cross section. More generally, without being limited to the examples shown, it is contemplated according to a preferred embodiment that the optical waveguide 1, or accordingly the dumbbell-shaped glass element 2 as well, comprises a cladding 39 and at least one core 37 that is surrounded by the cladding 39 and has a higher refractive index than the cladding 39 so that light can be conducted in the core by total internal reflection. In the embodiment shown in FIG. 3, a single core 37 is provided, which is surrounded by the cladding 39. In the embodiment according to FIG. 4, a plurality of cores 37 extend through a common cladding 39. The embodiment according to FIG. 4 may also serve as an image guide, for example. Thus, more generally, a glass optical waveguide 1 is provided according to one embodiment, which has a plurality of light-conducting cores 37 that extend through a shared cladding 39. In the embodiment according to FIG. 3, the optical waveguide 1 or the dumbbell-shaped glass element 2 has a circular cross section. Such an optical waveguide can simply be drawn from a corresponding circular glass rod comprising a core and a cladding. A glass rod with a plurality or multitude of cores 37, as shown in FIG. 4, can in turn be obtained by fusing together a plurality of core-cladding preforms. As a result of such fusing together of a plurality of thinner glass rods, it is possible that the resulting glass rod for producing the optical waveguide has a cross-sectional shape which deviates more or less strongly from a circular shape. Such a shape is also illustrated by the example of FIG. 4.

Irrespective of the specific cross-sectional shape, it is generally preferred that the cross sections of the intermediate and end-side length portions 5, 7, 9 each have a shape fitting in a smallest surrounding rectangle that has an aspect ratio of at most 3:1, preferably at most 2:1. The smallest surrounding rectangle 18 of the cross section is indicated in FIG. 4. Although the cross section is not circular here, the aspect ratio of the minimally surrounding rectangle 18 is nevertheless essentially that of a square, here.

Since the transition portion 11 along which the cross section tapers does not extend as far as to the thinner end, as is the case of corresponding optical waveguides drawn hitherto, but rather the thinner end extends over a certain length having a constant cross section, the change in cross section occurs over a comparatively shorter length. In order to minimize light losses within the range of the change in cross section in this case, a specific profile of the change has proven to be particularly advantageous. Generally for this purpose, a drawn dumbbell-shaped glass element 2 is provided according to a preferred embodiment, in particular for producing glass optical waveguides (1), which comprises two end-side length portions 5, 7 which have a first cross-sectional area and define the two ends of the glass element 2, and two transition portions 11, 13, a respective one between the end-side length portions 5, 7, with the cross-sectional area of the glass element steadily changing along the transition portions 11, 13 and merging from the first cross-sectional area into a second, smaller cross-sectional area, and with the cross section A in the central third of the transition portions 11, 13 increasing more slowly than the function $$A(l) = A_2 + (A_1 - A_2) * \left[\frac{1}{2} + \frac{1}{2}\tanh\left(6\frac{l-l_0}{l_u}\right)\right], \quad (1)$$

where l is the length coordinate, $A_1$ is the first and $A_2$ is the second cross-sectional area, $l_u$ is the length of the respective transition portion 11, 13, and $l_0$ is the length coordinate of the midpoint of the transition portion 11, 13.

In this embodiment too, an intermediate length portion 9 is preferably provided between the two transition portions. However, it is also possible for the two transition portions 11, 13 to directly merge into one another, in particular where the minimum second cross-sectional area is reached.

Usually, the change in cross section along the transition portion of a dumbbell-shaped glass element 2 or of the glass optical waveguide 1 produced therefrom by severing will even be smaller than given by equation (1). According to a preferred embodiment it is therefore contemplated that in the central third of the transition portions 11, 13 the cross section A increases more slowly than the function $$A(l) = 0.95 * (A_1 - A_2) * \left[\frac{1}{2} + \frac{1}{2}\tanh\left(6\frac{l-l_0}{l_u}\right)\right], \quad (2)$$

where, as in equation (1), l is the length coordinate, $A_1$ is the first and $A_2$ is the second cross-sectional area, $l_u$ is the length of the respective transition portion 11, 13, and $l_0$ is the length coordinate of the midpoint of the transition portion 11, 13.

According to yet another alternative or additional embodiment it is contemplated that the maximum change in cross section per unit length, dA(l)/dl, in a transition portion 11, 13 is greater than $(A_1-A_2)/l_u$ and is less than $3 \cdot (A_1-A_2)/l_u$, preferably less $2.41 \cdot (A_1-A_2)/l_u$.

Figure 5:
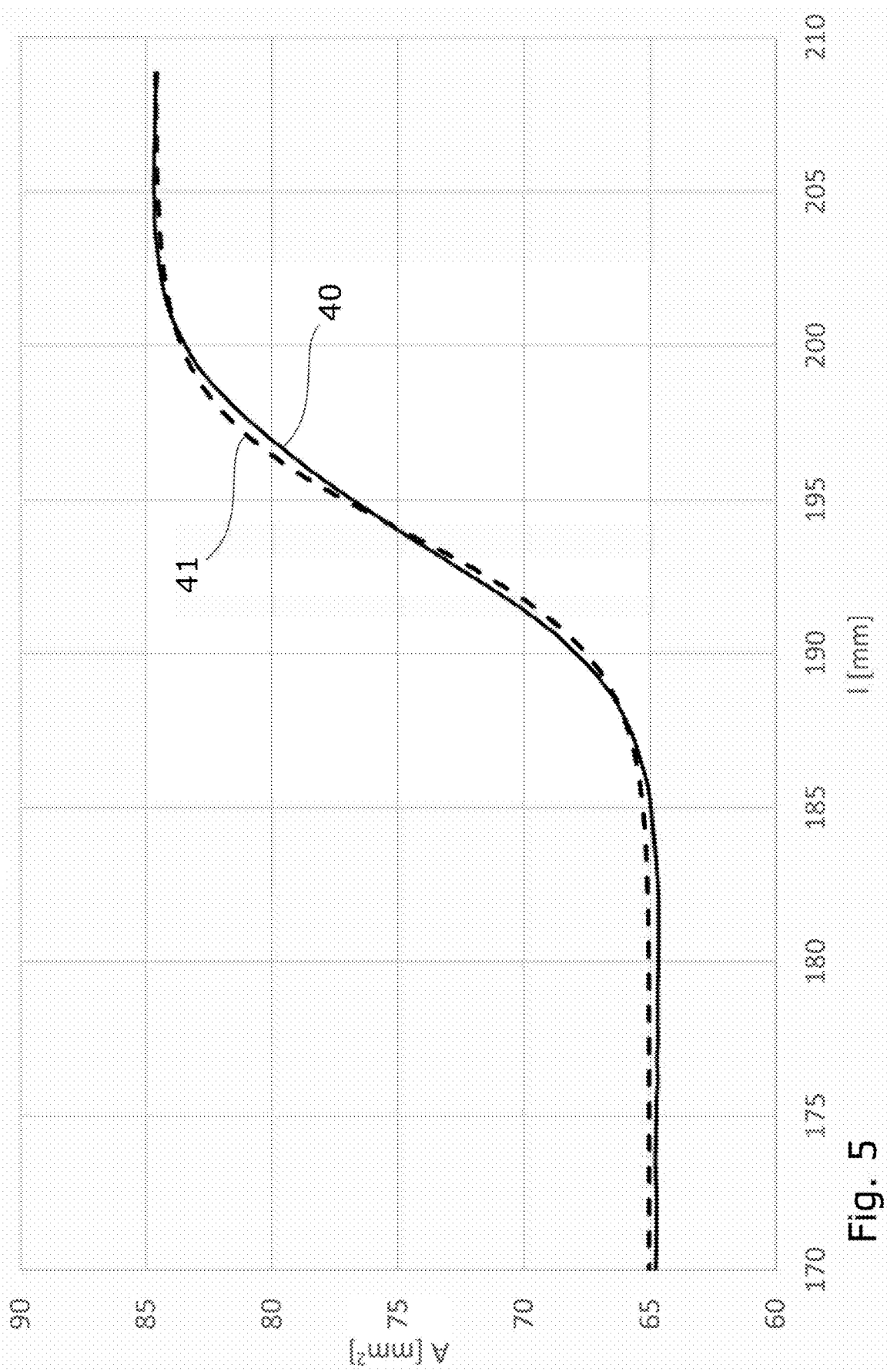
FIG. 5 shows a calculated profile and a measured profile of the cross section of an optical waveguide.

To illustrate this, FIG. 5 shows a comparison of the cross section profile in the area of transition portion 11 with a profile according to the curve specified above. Curve 40 in FIG. 5 represents measured values, while curve 41 reproduces the profile A(l) according to the equation given above.

In the illustrated example, transition portion 11 extends approximately between longitudinal values 185 mm and 205 mm, i.e. it has a length of approximately 20 mm. As can be seen, the transition portion is shaped such that the change in cross section is less than in curve 41, especially in the central part of the transition portion. This also implies a maximum slope in the profile, i.e. a maximum change in cross section, which is less than $3 \cdot (A_1-A_2)/l_u$, preferably less $2.41 \cdot (A_1-A_2)/l_u$. Such a maximum slope is achieved with a profile according to equation (1). However, the slope is also greater than $(A_1-A_2)/l_u$. Such a change would be achieved if the change in cross section were linear over the entire transition portion. However, with shaping by drawing, such a profile could only be approximately achieved in a simple manner if the transition portion is chosen to be very long.

Figure 6:
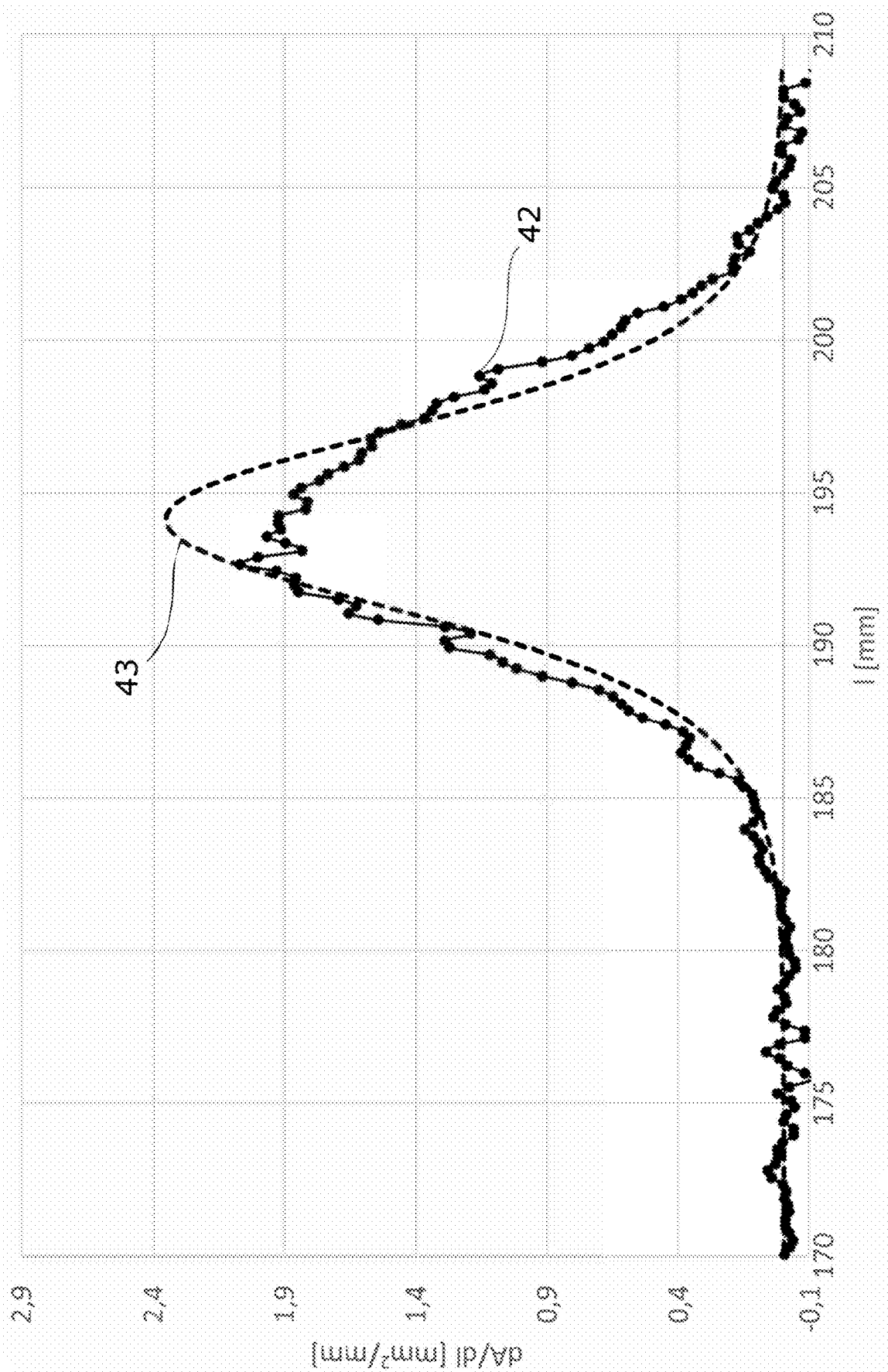
FIG. 6 shows derivatives of the curves from FIG. 5.

The difference to an idealized hyperbolic tangent function becomes particularly clear from the derivative of the curves shown in FIG. 5. The derivatives dA/dl of the curves are shown in FIG. 6. Curve 42 represents the derivative of the measured profile of cross section A with respect to the length coordinate l, dA/dl. Accordingly, curve 43 is the derivative of function (1). From the comparison it can be seen that the maximum change in the cross section of an optical waveguide according to the present disclosure is smaller than the maximum change in function (1). This lower maximum change increases the efficiency of concentrating the light, since less light will be scattered out in the transition area at the steepest points.

Figure 7:
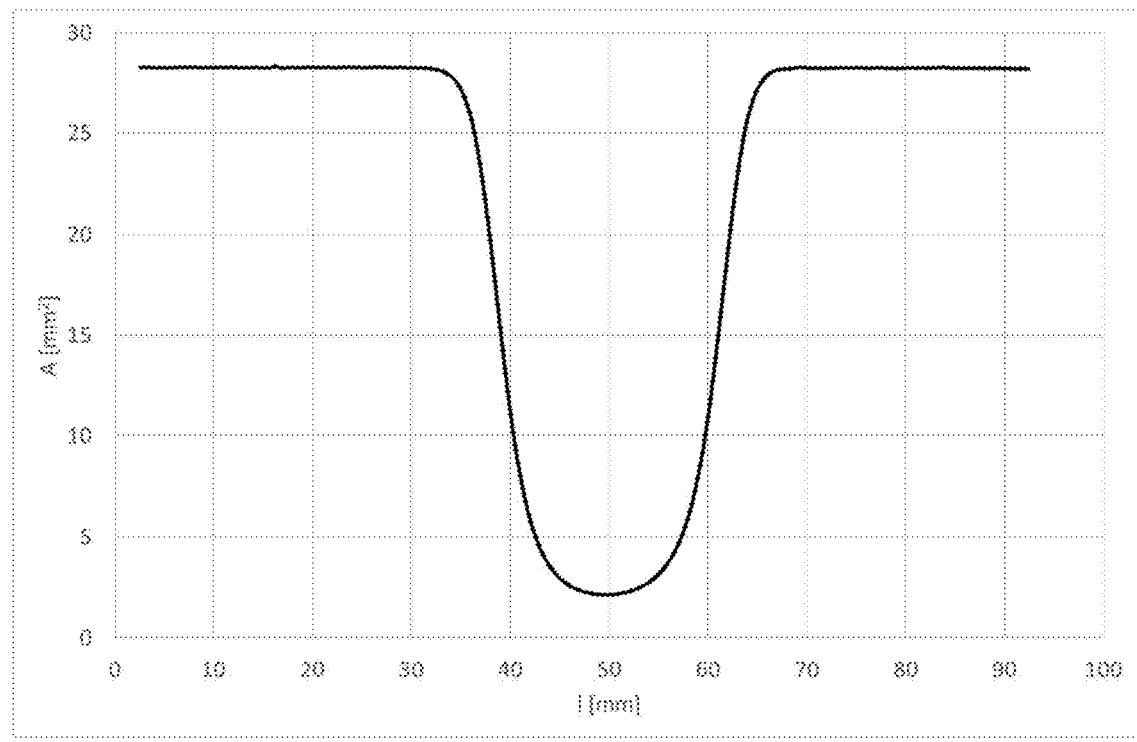
FIG. 7 is a graph of the profile of the cross-sectional area of a dumbbell-shaped glass element as produced using a conventional drawing process.

For comparison with FIG. 5, FIG. 7 shows a graph of the profile of the cross-sectional area of a dumbbell-shaped glass element 2 produced using a conventional drawing process. The glass element is produced in conventional manner, by central heating of the entire area to be reshaped and drawing it apart. As a result, in contrast to the examples of FIGS. 1 and 5, there is no intermediate length portion 9 that has a constant cross section.

Figure 8:
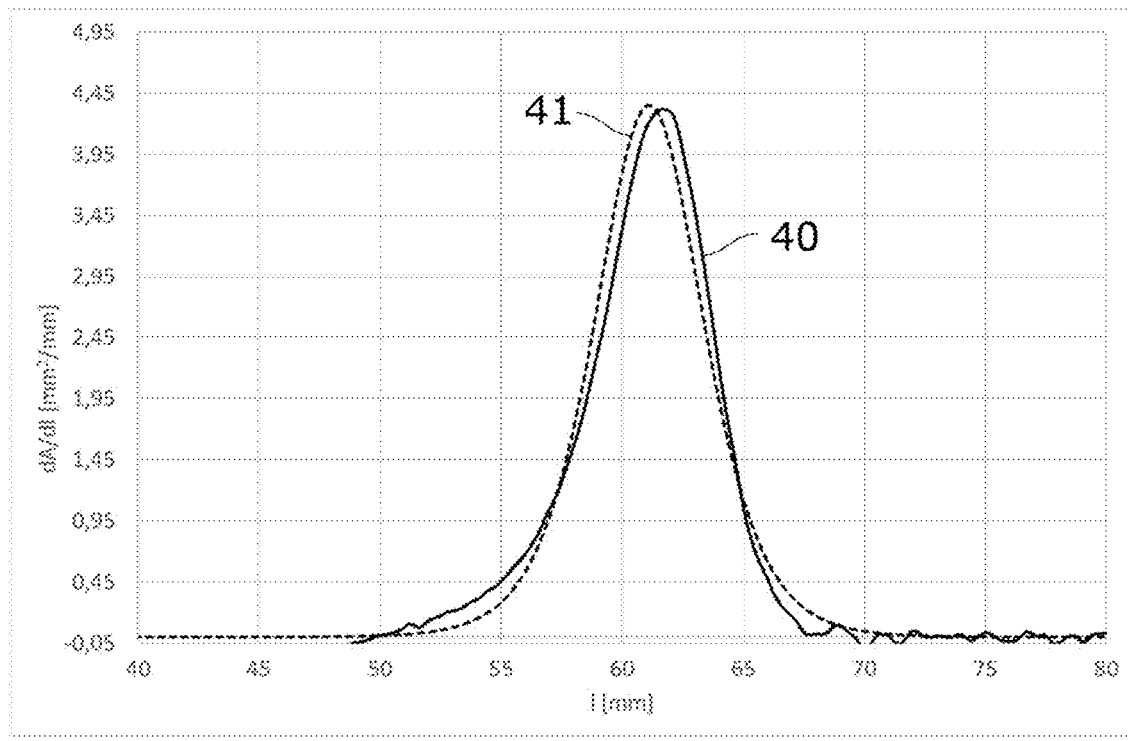
FIG. 8 shows a derivative of the profile from FIG. 7 in comparison with a calculated curve.

FIG. 8 shows the derivative of the profile within the range of the longitudinal location with minimum cross-sectional area at approximately 50 mm up to the length area in which the end of the glass element has a constant cross section. The derivative of the function according to equation (1) is also plotted. As can be seen, the curve profile follows the derivative very precisely. In particular the maximum values of the derivatives match very precisely. By contrast, the maximum change in cross section of a glass element 2 according to the present disclosure and accordingly also of an optical waveguide 1 made therefrom is lower for a given length of the transition portion.

More generally, without being limited to the examples shown, it is contemplated according to one embodiment that the mean change in cross-sectional area A per unit length l, dA/dl, in the respective transition area 11, 13 is in the range from $8 \cdot 10^{-5}$ mm$^2$/mm to $7 \cdot 10^3$ mm$^2$/mm. In the case of a circular cross section, or more generally, since a diameter can be associated with the cross section as shown above, the mean change in the diameter in the respective transition area 11, 13 averaged over the length of the transition area 11, 13 is in the range from 0.01 to 30. As will be appreciated, these parameters apply accordingly to an optical waveguide separated from the glass element 2.

The following table lists exemplary embodiments for the dimensions of the different portions:

| D1/mm | D2/mm | D1-D2 | D1/D2 | $A_1$/mm$^2$ | $A_2$/mm$^2$ | $A_1/A_2$ | Transition length/mm | dD/dl |
|---|---|---|---|---|---|---|---|---|
| 20.0 | 8.0 | 12.0 | 2.5 | 314.0 | 50.2 | 6.3 | 5 | 2.40 |
| 20.0 | 9.0 | 11.0 | 2.2 | 314.0 | 63.6 | 4.9 | 250 | 0.04 |
| 20.0 | 4.0 | 16.0 | 5.0 | 314.0 | 12.6 | 25.0 | 10 | 1.60 |
| 19.0 | 10.0 | 9.0 | 1.9 | 283.4 | 78.5 | 3.6 | 10 | 0.90 |
| 19.0 | 10 | 9.0 | 1.9 | 283.4 | 78.5 | 3.6 | 40 | 0.23 |

-continued

| D1/mm | D2/mm | D1-D2 | D1/D2 | $A_1$/mm$^2$ | $A_2$/mm$^2$ | $A_1/A_2$ | Transition length/mm | dD/dl |
|---|---|---|---|---|---|---|---|---|
| 18.0 | 2.0 | 16.0 | 9.0 | 254.3 | 3.1 | 81.0 | 20 | 0.80 |
| 15.0 | 8.0 | 7.0 | 1.9 | 176.6 | 50.2 | 3.5 | 10 | 0.70 |
| 13.0 | 8.0 | 5.0 | 1.6 | 132.7 | 50.2 | 2.6 | 8 | 0.63 |
| 13.0 | 6.0 | 7.0 | 2.2 | 132.7 | 28.3 | 4.7 | 10 | 0.70 |
| 13.0 | 8.0 | 5.0 | 1.6 | 132.7 | 50.2 | 2.6 | 25 | 0.20 |
| 11.0 | 6.0 | 5.0 | 1.8 | 95.0 | 28.3 | 3.4 | 8 | 0.63 |
| 10.5 | 9.0 | 1.5 | 1.2 | 86.5 | 63.6 | 1.4 | 5 | 0.30 |
| 10.5 | 8.0 | 2.5 | 1.3 | 86.5 | 50.2 | 1.7 | 6 | 0.42 |
| 10.0 | 8.0 | 2.0 | 1.3 | 78.5 | 50.2 | 1.6 | 5 | 0.40 |
| 6.0 | 2.0 | 4.0 | 3.0 | 28.3 | 3.1 | 9.0 | 6 | 0.67 |
| 6.0 | 1.0 | 5.0 | 6.0 | 28.3 | 0.8 | 36.0 | 8 | 0.63 |

In this table, D1 is the diameter and $A_1$ is the cross-sectional area of length portions 5, 7. D2 is the diameter and $A_2$ is the cross-sectional area of intermediate length portion 9 and of the second length portion 10 of the optical waveguide. Transition length is the length of transition portion 11 or 12, respectively. D1–D2 is the difference and D1/D2 is the ratio of diameters D1 and D2. $A_1/A_2$ is the ratio of the cross-sectional areas $A_1$ and $A_2$. The last column lists the mean change in diameter dD per unit length l in transition portion 11, 12. In the exemplary embodiments, the ratio of diameters, D1/D2, is within the range from 1.1 to 10. Furthermore, the mean change in diameter per unit length is in the range from 0.01 to 30. Particularly preferably, and without being limited to the examples in the table, the mean change in diameter per unit length is at most 3. Hence, the mean change in diameter per unit length preferably ranges from 0.01 to 3.

Figure 9:
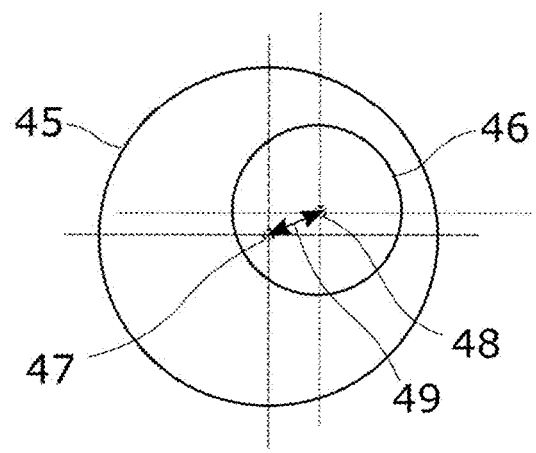
FIG. 9 shows the superimposed cross-sectional areas of the glass element or optical waveguide as seen in the axial direction.

The method according to the present disclosure allows to produce a dumbbell-shaped glass element 2 or an optical waveguide 1 with only a small, ideally infinitesimally small radial offset of the length portions. According to one embodiment it is therefore contemplated that the intermediate length portion is arranged concentrically to at least one of the end-side length portions 5, 7, such that the center-to-center distance between the cross sections as seen from the longitudinal direction or axial direction is smaller than half the smallest lateral dimension of the cross section of intermediate portion 9. For an optical waveguide produced by severing the dumbbell-shaped glass element 2, this condition then applies accordingly to the cross sections of the first and second length portions 5, 10. FIG. 9 shows the cross-sectional areas 45 and 46 of length portions 5 and 9 as seen from the axial direction. Here, the cross-sectional areas 45, 46 are offset to one another so that the centers 47, 48 of cross-sectional areas 45, 46 do not coincide when viewed in the axial direction. Accordingly, a center-to-center distance 49 is resulting in the radial direction between the centers 47, 48. However, as discussed above, this offset is smaller than the smallest lateral dimension of cross-sectional area 46. Therefore, the center 47 of cross-sectional area 45 will always be within the smaller cross-sectional area 46 of the intermediate length portion 9, as viewed from the longitudinal direction (in the case of the optical waveguide within the cross-sectional area 46 of the second length portion 10). This small and ideally infinitesimally small offset is also favorable for the optical efficiency for the concentration of light along the respective transition portion 11, 13.

Figure 10:
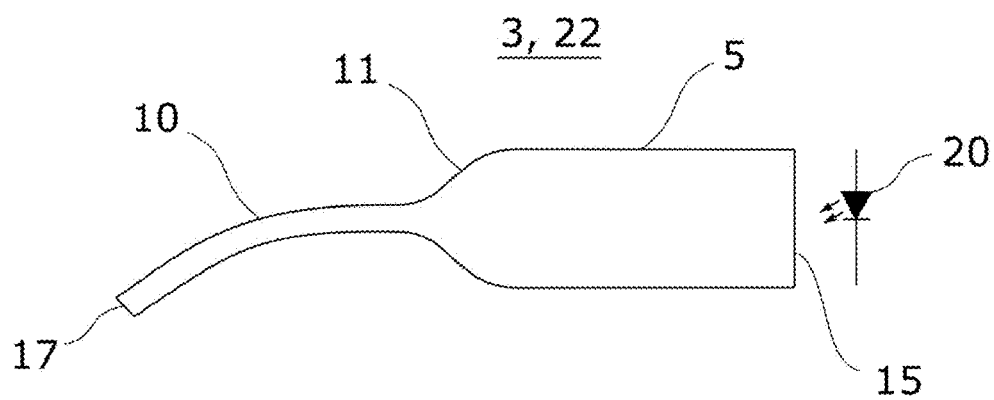
FIG. 10 shows an embodiment of a light source comprising a curved length portion.

According to a further embodiment of an optical waveguide, the second length portion 10 may be curved. One example of such an embodiment is shown in FIG. 10. Regardless of the curvature, the cross section remains constant along the second portion 10. Such a curvature is advantageous for the handling of special handpieces, for example when the front inner sides of the jaws of the oral cavity are to be illuminated with the handpiece. Furthermore, FIG. 10 overall shows a light source 3 which comprises a drawn glass optical waveguide 1 according to the present disclosure and at least one light emitter 20 which is arranged so that its light is injected into the optical waveguide 1 via end face 15 of first length portion 5 and, after passing through the optical waveguide, is emitted at the other end face 17 of second length portion 10. It goes without saying that, instead of the curved optical waveguide, the light source 3 may generally also be equipped with a straight optical waveguide 1 as shown in FIG. 2, for example. As illustrated, a light-emitting diode is preferably used as the light emitter 20. In particular, a plurality of light-emitting diodes may be provided, which jointly illuminate the end face 15. As a result of the cross section of the optical waveguide 1 getting smaller from the light entry surface 15 towards the light exit surface 17, light concentration or an increase in spatial radiation intensity occurs at the light exit end, i.e. on end face 17. As mentioned before, such a light source 3 may form part of a dental handpiece 22.

Further applications of such a light source 3 include the curing of plastics material and/or in a device for identifying cell types, in particular cancer cells, for applications in the field of dental medicine, in particular in a dental curing device, in a device for detecting caries, in dental handpieces and/or in dental contra-angles, in surgical devices and/or in diagnostic devices, in particular skin analysis devices, in otoscopes, and/or endoscopes, for light-induced treatment of inflammations in the throat/pharynx (mucositis), in ophthalmology (ophthalmia), and in dermatology.

Advantageous applications can also be found in industrial curing of adhesives by UV light or when used in an inspection system for monitoring systems or machines. Furthermore it can be used in analytics such as in the monitoring or testing of liquid substances for implementing simple imaging fiber-optic-based monitoring instruments in particular for environments with high temperatures, moisture and/or dirt.

It is therefore also possible for the light source 3 comprising a drawn glass optical waveguide 1 to be used for an inspection system for monitoring systems or machines and/or for performing and monitoring industrial joining processes and/or adhesive processes and/or for laser welding processes and/or for riveting and/or for detecting bodies in liquids and/or in water monitoring.

Figure 11:
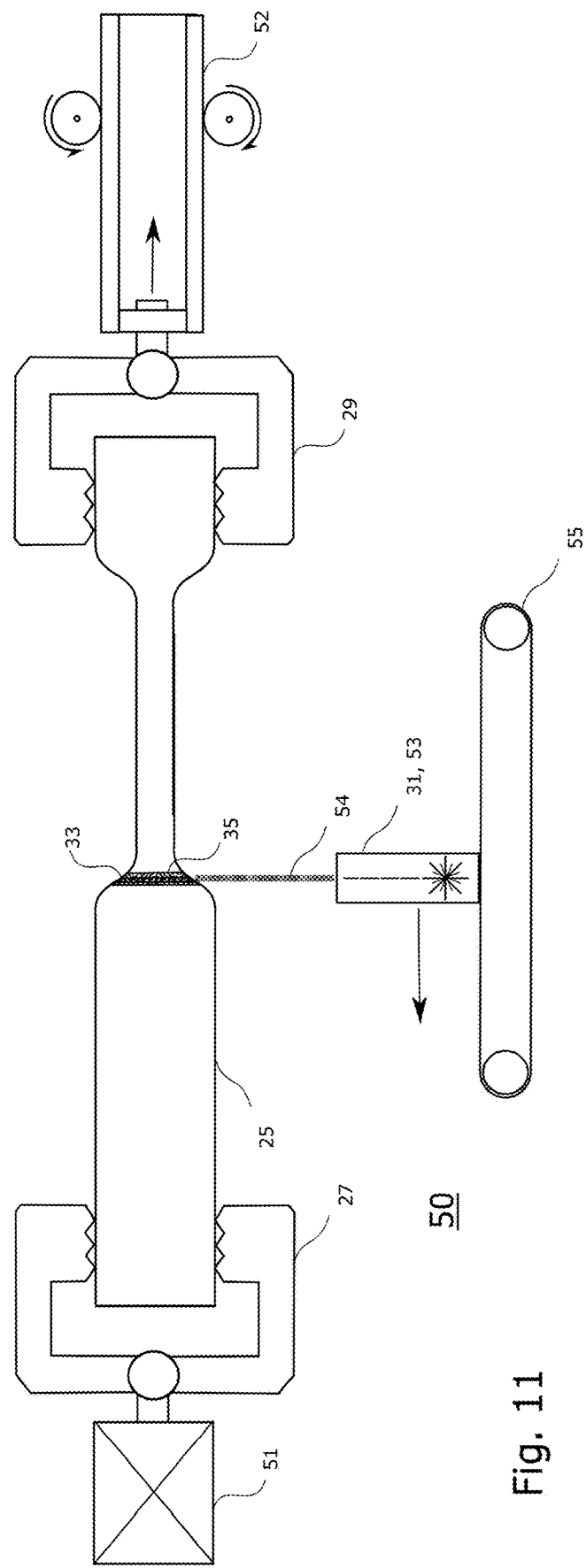
FIG. 11 shows an apparatus for producing a dumbbell-shaped glass element.

FIG. 11 shows an apparatus 50 which can be used to produce a dumbbell-shaped glass element 2 according to the present disclosure. For the making, a glass rod 25 is provided and is held by two brackets 27, 29 of the apparatus 50. Brackets 27, 29 hold the glass rod 25 at its ends, that is in two areas of the glass rod 25 spaced apart along the longitudinal extension thereof. For hot forming the glass rod, a heating device is used for heating the glass locally. Radiant heating is particularly suitable for this purpose. Specifically, a light source 31 is provided and used to illuminate an annular area 33 of the surface of glass rod 25. However, other heating sources may also be provided, as an alternative or in particular in addition thereto. The heating device(s) can then be used to set locally and/or temporally variable heating profiles.

Preferably, a sufficiently powerful laser 53 is used as the light source 31, for example a $CO_2$ laser. For irradiating an annular area on the glass rod 25 by the laser beam 54 it is generally contemplated, according to one embodiment, without being limited to the example shown, that the glass rod 25 is rotated about its longitudinal axis during the irradiation by the light source 31. For this purpose, the apparatus 50 comprises a drive 51 which can be used to rotate the brackets 27 and thereby the glass rod 25 about the longitudinal axis thereof. The light source 31 heats up a length portion 35 of the glass rod 25 until it softens. Typically, the length portion 35 is wider than the annular area 33 irradiated by the light source 31. Once softened, the glass rod 25 is then drawn apart at the brackets 27, 29, so that the glass rod 25 tapers along the softened length portion. For being drawn apart, a drawing means 52 is provided which acts on the bracket 29 in the illustrated example. Concomitantly with the drawing movement by which the glass rod 25 tapers and is drawn apart, the annular area 33 and the glass rod 25 are also shifted relative to one another along the longitudinal direction of the glass rod 25. In the illustrated example, an advancement means 55 is provided for this purpose, which is operable to shift the point of incidence of the laser beam 54 along the longitudinal extension of the glass rod 25. Both movements, namely the drawing apart and the shifting of the annular area 33 along the glass rod 25 are effected according to predetermined speed profiles. Accordingly, a predetermined speed profile is set for the relative shift of annular area 33, and a predetermined speed profile is set for the rate of drawing apart the glass rod 25, and the two speed profiles are interlinked. In this way, the thinning of the glass rod 25 can be controlled such that, between two end-side length portions 5, 7, an intermediate length portion 9 is drawn, which has a second cross-sectional area that is consistent along the intermediate length portion and is smaller by at least a factor of 1.2 compared to the first cross-sectional area of the end-side length portions 5, 7, and this intermediate length portion 9 merges into the end-side length portions 5, 7 along transition portions which have a steadily increasing cross section.

More generally, without being limited to the illustrated example, it proved to be particularly advantageous to not soften the glass too much. In the case of excessive softening it is more difficult to control the reshaping by the interlinked movements. Also, strong softening causes an expansion of the area within which the glass can be reshaped. This also leads to less control over reshapeability. In the case of an elongated reshaping zone, a transition area would be formed with a cross section that changes according to equation (1) above. According to a preferred embodiment it is therefore generally contemplated for the glass rod 25 to be heated such that the minimum viscosity of the glass does not fall below a value of $\eta=10^4$ dPa·s when the glass rod is drawn apart.

Figure 12:
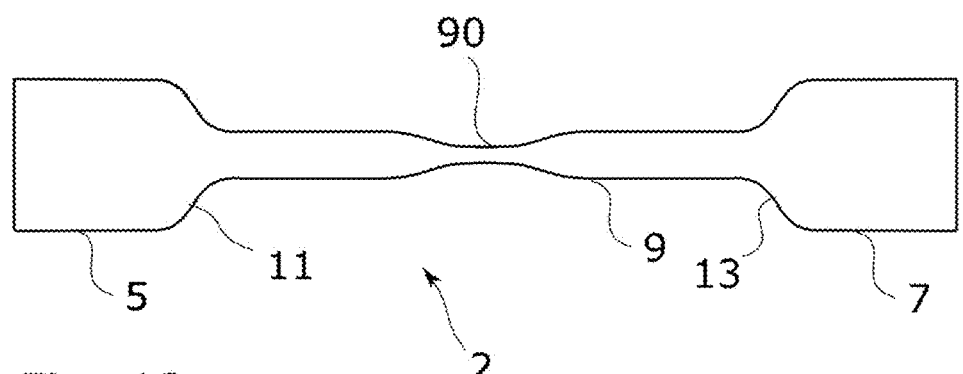
FIG. 12 shows a variant to the glass element of FIG. 1, with a cross-sectional shape that has been modified by hot pressing in sections thereof.

In the examples described so far, it was not only the cross-sectional area of the second, intermediate length portion that was consistent, but also the cross-sectional shape thereof. According to one embodiment, it is also possible to modify the cross-sectional shape of a length portion, preferably of the second length portion. This modification may usually be obtained through a hot pressing process. By changing the cross-sectional shape of at least one length portion 5, 7, 9 by hot pressing, it is possible to adapt the geometry of the so produced optical waveguide to particular conditions such as the design and desired geometry of a handpiece, for example. The hot pressing is preferably performed after the drawing, that is after the thinner portion has been produced. FIG. 12 shows a side view of a variant of the glass element 2 of FIG. 1. In this variant, the second length portion 9 comprises a portion 90 with a modified cross-sectional shape. More particularly, the cross section may become flatter as a result of the hot pressing, or it may be modified from a rather circular shape into a flattened shape. However, this flattening does not have to be accompanied by a significant change in the cross-sectional area. Although the lateral dimension of portion 90 is smaller compared to the rest of the second portion 9 in the view of FIG. 12, the lateral dimension along the viewing direction can be larger so that the cross-sectional area remains the same. For better comprehension, FIG. 13 shows a perspective view of an optical waveguide 1 made from glass element 2. The optical waveguide 1 was produced by severing the glass element 2 at portion 90. The flattened shape of the end face 17 of the optical waveguide 1 obtained by the severing is clearly visible in FIG. 13.

FIGS. 14*a-f* show various cross-sectional shapes that are produced in portion 90 by hot pressing and which may therefore accordingly define the shape of an end face 17 of an optical waveguide 1 produced therefrom. FIG. 14*a* shows an elliptical cross section. FIG. 14*b* shows a portion 90 or, correspondingly, an end face 17 having a rectangular cross section. FIG. 14*c* is a variant of a rectangular cross section with rounded corners. More generally, the cross section may be polygonal. In addition to the examples of polygonal cross sections according to panels FIG. 14*b* and FIG. 14*c*, FIG. 14*d* shows a further embodiment in the form of a triangular cross section. Panel FIG. 14*e* shows a kidney-shaped portion with a correspondingly shaped end face. The hot pressing also allows to form rather small features. FIG. 14*f* shows an example for this, in which a latching feature 91 was formed by hot pressing. Latching feature 91 may have the shape of a rib extending in the longitudinal direction, for example.

It will be appreciated that it is also possible to not only reshape the second or intermediate length portion 9 of the glass element 2 by hot pressing. Another portion of glass element 2 such as one or both of the first length portions 5, 7 may be reshaped as well. Therefore, without being limited to the exemplary embodiments, it is contemplated that the glass element 2 or the optical waveguide 1 made therefrom has a length portion with a cross-sectional shape that differs from the cross-sectional shape of adjoining portions, in particular from a circular cross-sectional shape. If this different, in particular non-circular cross-sectional shape is produced by hot pressing, as described, the glass will essentially yield sideways to the exerted pressure. Thereby, the cross-sectional shape is altered, but the cross-sectional area remains essentially the same. Therefore, according to yet another embodiment, it is contemplated for the glass element 2 or the glass optical waveguide 1 to have a length portion that differs in its cross-sectional shape from at least one adjoining portion, while the cross-sectional areas of the length portion and the adjoining length portion are preferably equal. In the sense of the present disclosure, consistent cross-sectional area is meant to encompass slight differentials, for example as caused by the glass flowing in the longitudinal direction during the hot pressing. However, the differentials in cross-sectional areas in particular do not exceed 5%.

In the examples described so far, the first length portions 5, 7 at the same time defined end-side length portions of the glass element 2. Also, the diameters or cross-sectional areas of these end-side portions were the same. However, neither of this is mandatory. Furthermore, the length of the two transition portions adjoining the intermediate length portion may also be different. FIG. 15 shows an example of a glass element 2 which, unlike the glass element shown in FIG. 1, has two second or intermediate length portions 9, 92. Thus, more generally, a plurality of intermediate, second length portions may be provided. Also, as shown, the second length portions 9, 92 may differ in terms of their cross-sectional area, in particular in their diameter. In the present example, the second length portion 9 is provided between two first length portions 5, 7, and the further second length portion 92 is provided between the two first length portions 7, 70. The cross sections of the different length portions change along transition portions 11, 13, 110, and 130. According to a further embodiment which is also implemented in the illustrated example, the transition portions have a different length. In the example shown, transition portion 11 is significantly longer than transition portion 13. Also, this feature is not limited to the presence of a plurality of second, intermediate length portions, but may also be present in the example shown in FIG. 1, for example.

LIST OF REFERENCE NUMERALS

1 Glass optical waveguide
2 Glass element
3 Light source
5, 7, 9, 10, 70, 92 Length portion
11, 13, 110, 130 Transition portion
15, 17 Front face
18 Smallest surrounding rectangle
20 Light emitter
22 Dental handpiece
25 Glass rod
27, 29 Bracket
31 Light source
33 Annular area on 25
35 Heated length portion
37 Core
39 Cladding
40 Profile of cross-sectional area
41 Profile of comparison function
42 Derivative of 40
43 Derivative of 41
45 Cross-sectional area of 5
46 Cross-sectional area of 9, 10
47 Center of 45
48 Center of 46
49 Distance between 47, 48 in radial direction
50 Apparatus for producing 2
51 Drive
52 Drawing means
53 Laser
54 Laser beam
55 Advancement means
90 Portion with modified cross-sectional shape
91 Latching feature

What is claimed is:

1. A drawn glass element for producing glass optical waveguides, comprising:
two first length portions with a first cross-sectional area and which define the two ends of the glass element;
an intermediate length portion between the two first length portions, which has a second cross-sectional area smaller than the first cross-sectional area;
a first transition portion between the intermediate length portion and one of the first length portions; and
a second transition portion between the intermediate length portion and another of the first length portions, wherein the first and second transition portions have a cross-sectional area that steadily changes and merges from the first cross-sectional area into the second cross-sectional area,
wherein the first and second transition portions have a central third, wherein the central third has a cross section (A) that increases more slowly than a function $$A(l) = 0.95 * (A_1 - A_2) * \left[\frac{1}{2} + \frac{1}{2}\tanh\left(6\frac{l-l_0}{l_u}\right)\right],$$

wherein l is a length coordinate in mm, $A_1$ is a first second cross-sectional area in mm$^2$, $A_2$ is a second cross-sectional area mm$^2$, $l_u$ is a length of the first and second transition portions in mm, and $l_0$ is a length coordinate of a midpoint of the first and second transition portion in mm.

2. The glass element of claim 1, further comprising a maximum change in cross section per unit length (dA(l)/dl) in the first and/or second transition portions that is greater than $(A_1-A_2)/l_u$ and is less than $2.4 \cdot (A_1-A_2)/l_u$.

3. The glass element of claim 1, further comprising a feature selected from a group consisting of: the second cross-sectional area being smaller than the first cross-sectional area by at least a factor of 1.2; the intermediate length portion having a length of at least three times a square root of the second cross-sectional area; a ratio of a cross-sectional area Q1 of the two first length portions to a cross-sectional area Q2 of the intermediate length portion that is in a range from 1.1 to 100; a ratio of a diameter D1 of the two first length portions to a diameter D2 of the intermediate length portion that is in a range from 1.1 to 10; a mean change in diameter in the first and second transition portions averaged over the length of the first and second transition areas that is in a range from 0.01 to 30; a mean change in diameter in the first and second transition portions averaged over the length of the first and second transition areas that is in a range from 0.01 to 3; a mean change in cross-sectional area (A) per unit length (l) in the first and second transition portions that is in a range from $8 \cdot 10^{-5}$ mm$^2$/mm to $7 \cdot 10^3$ mm$^2$/mm; a cross section A in a central third of the first and second transition portions that increases more slowly than the function $$A(l) = 0.95 * (A_1 - A_2) * \left[\frac{1}{2} + \frac{1}{2}\tanh\left(6\frac{l-l_0}{l_u}\right)\right],$$

wherein l is the length coordinate in mm, $A_1$ is a first cross-sectional area and $A_2$ is a second cross-sectional area in mm$^2$, $l_u$ is a length of first and second transition portions in mm, and $l_0$ is a length of a midpoint of the first and second transition portions in mm; a plurality of intermediate length portions; the first and second transition portions having different lengths; and any combinations thereof.

4. The glass element of claim 1, wherein the intermediate length portion and the two first length portions have cross sections with a shape fitting in a smallest surrounding rectangle with an aspect ratio of at most 3:1.

5. The glass element of claim 1, wherein the two first length portions and the intermediate length portions have a circular cross-sectional shape.

6. The glass element of claim 1, wherein the intermediate length portion is arranged concentrically to at least one of the two first length portions so that a center-to-center distance of cross sections as seen in a longitudinal direction is smaller than half a smallest lateral dimension of the cross section of the intermediate length portion.

7. The glass element of claim 1, wherein the two first length portions have a largest lateral dimension that is less than 50 mm.

8. The glass element of claim 1, wherein the two first length portions are end-side length portions of the glass element.

9. A drawn glass optical waveguide, comprising a severed portion obtained by severing the glass element of claim 1 in the intermediate length portion.

10. The glass optical waveguide of claim 9, wherein the severed portion is curved.

11. The glass optical waveguide of claim 9, wherein the glass optical waveguide is sized and configured as an image guide and further comprises a multitude of individual optical fibers fused together.

12. The glass optical waveguide of claim 9, further comprising a plurality of light-conducting cores extending through a common cladding.

13. A light source, comprising:
a drawn glass optical waveguide of claim 10; and
at least one light emitter disposed to inject light into the drawn glass optical waveguide via an end face of the first length portion and/or an end face of the severed portion.

14. The light source of claim 13, where in the light source is sized and configured for a use selected from a group consisting of curing plastics material, identifying cell types, identifying cancer cells, dental medicine, curing of dental materials, detecting caries, dental handpieces, dental contra-angles, surgical devices, diagnostic devices, skin analysis devices, otoscopes, endoscopes, light-induced treatment of inflammation devices for the throat/pharynx, light-induced treatment of inflammation devices for ophthalmology, light-induced treatment of inflammation devices for dermatology, an inspection system for monitoring systems, inspection system for machines, inspection system for industrial joining processes, inspection system for adhesive processes, inspection system for laser welding processes, inspection system for riveting, inspection system for detecting bodies in liquids, inspection system for water monitoring.

15. A method for producing a drawn glass optical waveguide according to claim 9, comprising:
supporting a glass rod via brackets in two areas spaced apart in a longitudinal direction of the glass rod;
heating an annular area of the glass rod between the brackets until a portion of the glass rod between the brackets softens; and
drawing apart the glass rod at the brackets so that the glass rod tapers along the portion with annular areas at the brackets being shifted relative to one another along the longitudinal direction,
wherein the drawing apart has a first speed profile of relative movement of shifting of the annular areas and a second speed profile for a rate of drawing apart the glass rod, the first and second speed profiles being interlinked such that an intermediate length portion is drawn between the first length portions so as to have a second cross-sectional area that is reduced by at least a factor of 1.2 compared to the first cross-sectional area of end-side length portions, which intermediate length portion merges into the end-side length portions along transition portions that have a steadily increasing cross section.

16. The method of claim 15, wherein the annular area is heated using a radiation source.

17. The method of claim 16, wherein the annular area is heated using a laser.

18. The method of claim 17, wherein the glass rod is rotated about a longitudinal axis while being irradiated by the laser.

19. The method of claim 15, further comprising modifying a cross-sectional shape of at least one length portion by hot pressing.

* * * * *